United States Patent [19]

Boxhorn et al.

[11] Patent Number: 4,573,432
[45] Date of Patent: Mar. 4, 1986

[54] WIRE MESH FLOORING

[75] Inventors: John F. Boxhorn; George R. Boxhorn, both of Brookfield, Wis.

[73] Assignee: C. I. Banker Wire & Iron Works, Inc., Milwaukee, Wis.

[21] Appl. No.: 668,514

[22] Filed: Nov. 5, 1984

[51] Int. Cl.⁴ .............................................. A01K 1/015
[52] U.S. Cl. ..................................................... 119/28
[58] Field of Search ..................... 119/28; 52/664, 666, 52/668, 669

[56] References Cited

U.S. PATENT DOCUMENTS

| 107,171 | 9/1870 | Frick | 52/664 |
|---|---|---|---|
| 3,230,931 | 1/1966 | Taylor et al. | 119/28 |
| 4,325,326 | 4/1982 | Schierenbeck | 119/28 |
| 4,362,128 | 12/1982 | Downey | 119/28 |

Primary Examiner—Hugh R. Chamblee
Attorney, Agent, or Firm—James C. Nemmers

[57] ABSTRACT

A wire mesh floor for use in hog houses. The warp wires in the woven flooring are shaped with a flat surface on top and have a cross-sectional shape so that the widest portion of each warp wire is at or near the top flat surface. This construction improves the comfort and cleanability of the finished flooring without any loss of strength or rigidity.

6 Claims, 3 Drawing Figures

WIRE MESH FLOORING

BACKGROUND OF THE INVENTION

In the breeding and raising of pigs, the newborn little pigs are commonly confined with the sow in farrowing pens. After the pigs are weaned, they are then placed in hog-finishing buildings until they are ready for market. The construction of these pens and buildings must be such to provide feed and rest areas and also to provide for ease of cleaning and waste removal. Typically, the flooring in such buildings should allow waste to drop through to a pit beneath the flooring. Various flooring designs have been developed and commercially used. One such flooring is a wire mesh flooring which consists of woven wire in which the warp and crosswires are woven together in a manner to provide rectangular-shaped openings between the wires to permit the passage of waste. However, the wires must be spaced sufficiently close so that the pigs' feet do not slip through the openings. On the other hand, the openings must be large enough to permit the easy passage of waste to the pit beneath the floor.

One disadvantage of the wire mesh flooring is that the flooring tends to produce leg, knee and foot sores and abrasions. This is because the woven wires are typically circular in cross-section and provide little contact surface with the pigs. Thus, the wires tend to abrade or cut the animals. Some manufacturers form various degrees of flatness on the top side of the round wires to increase the surface area in an attempt to make the flooring more comfortable for the animals. However, when a round wire is flattened, this substantially decreases the rectangular moment of inertia about the bending axis of the wire. This results in much greater floor deflection for a given unit loading. Deflection is undesirable since it tends to make the pigs nervous. Also, because of the design of the woven wires, cleaning can become difficult because the narrowest part of each opening if not at or even near the top surface of the flooring.

There is therefore a need for an improved flooring that will minimize if not eliminate the problem of leg, knee and foot sores and abrasions. There is also a need for an improved wire mesh flooring that is easier to clean and will thus minimize disease due to bacteria buildup. Such an improved wire mesh flooring must also have sufficient strength and be capable of being manufactured at a reasonable cost.

SUMMARY OF THE INVENTION

The improved wire mesh flooring of the invention uses warp wires that are flat on top and which have a cross-sectional shape so that the widest portion of each wire is at or near the top flat surface. Using warp wires of such a design in a wire mesh flooring provides a flooring that has a more comfortable and larger surface-contact area thus greatly minimizing the problem of leg, knee and foot sores and abrasions. Using warp wires of such a design also improves the cleanability of the wire mesh flooring since the widest portion of the warp wire is at or near the top. Thus, once waste is deposited on the top surface, it can pass easily through the openings between the wires since these openings increase in size from top to bottom of the flooring. The foregoing is accomplished in the wire mesh flooring of the invention without any loss of strength, and in fact the strength of the flooring is increased over conventional designs of wire mesh flooring.

DESCRIPTION OF THE PREFERRED EMBODIMENT OF THE INVENTION

Figure 1:
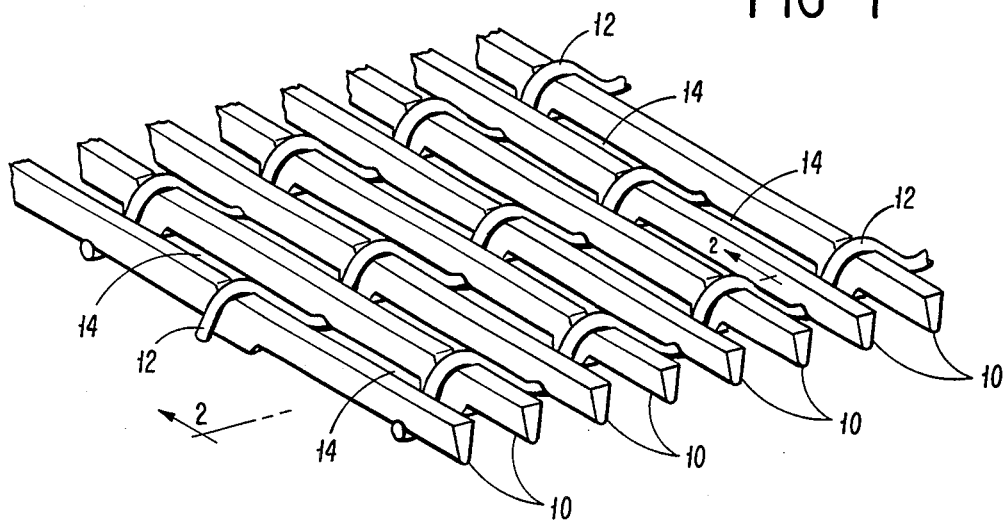
FIG. 1 is a perspective view of a section of wire mesh flooring constructed according to the principles of the invention.

Referring first to FIG. 1, there is shown a section of wire flooring constructed according to the principles of the invention and in which a plurality of warp wires 10 are interwoven with the crosswires 12. The warp wires all run in the same direction and are parallel to each other. The crosswires run transversely to the various warp wires and are spaced apart and are parallel to each other. The interweaving of the warp wires 10 and the crosswires 12 defines rectangular spaces 14, with the long side of each rectangular space 14 being defined by two warp wires 10 with the short sides of the rectangular space 14 being defined by the crosswires 12. Typically, the rectangular spaces or openings 14 are approximately 3/10 of an inch by 1½ inches which provides a sufficiently large opening to permit the easy passage of waste into the pit typically constructed beneath the flooring formed by the wire mesh. However, the dimensions of the rectangular openings 14 are such that a small pig can comfortably walk over the flooring without its feet or any part thereof slipping through an opening and becoming caught.

In the invention described herein, if the warp wires 10 are spaced at the same intervals as those in the typical round wire mesh flooring and if the warp wires 10 have the same cross-sectional area, a greater surface area will be presented to the animals and a stiffer floor for the same unit area will result. This is accomplished with improved cleanability and strength. However, we prefer to space the warp wires 10 closer together than the typical round wire mesh flooring to improve the comfort without loss of cleanability. This will become more evident as the flooring of the invention is described in more detail.

Each crosswire 12 is formed from a steel wire round in cross-section and has a diameter of approximately 2/10 of an inch. However, each warp wire 10 has a cross-sectional shape that provides a flat top surface 16 along the entire length of each wire 10. The cross-sectional shape of each warp wire 10 is such that the widest portion is at or near the flat top surface 16. In the drawings, the warp wires 10 are each shown with a flat surface with the widest portion of each wire 10 being at the top. However, in some instances, small radii may be formed along each top edge so that the widest portion may be slightly below but still near the top surface 16. Obviously, a variety of cross-sectional shapes could be used for the warp wires 10, but we prefer a shape that tapers from top to bottom and in which the ratio of the height of each wire 10 to its width is equal to or greater than 1. We have found that this provides a wire that will accomplish all the purposes of the invention and yet will provide a wire that is extremely strong thus minimizing flexing of the finished floor. The tapered shape in which the top surface 16 is the widest portion of the warp wire 10 also facilitates cleaning since once the waste passes through the openings 14 the openings become larger from top to bottom. The flat top surfaces 16 of the warp wires 10 also provide the maximum surface area for a floor of this type. This is extremely important since this provides a much more comfortable surface for the little pigs and hogs greatly reducing abrasions and sores that might otherwise be created.

In order to maintain the flat surfaces 16 of the warp wires 10 in a common plane, it is necessary to assure that the warp wires 10 and cross wires 12 are woven together in a manner that will minimize any relative movement. Therefore, at the juncture of each cross wire 12 with a warp wire 10, the cross wire 12 is formed with a flat portion 18 that engages with a corresponding flat portion in one of the depressions 20 that are formed at spaced intervals along each of the warp wires 10. Depressions 20 are formed to a depth so that the cross wires 12 will not protrude above the flat surface 16 of the warp wires 10, thus maintaining the comfortable flat surface of the finished product.

Figure 2:
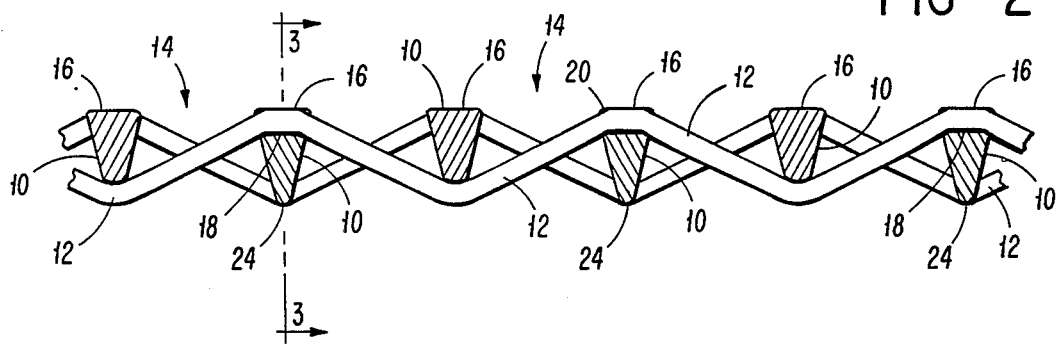
FIG. 2 is a sectional view taken on the line 2—2 of FIG. 1.

To further maintain the rigidity of the wire mesh flooring, the bottom edge 24 of each warp wire 10 is preferably slightly rounded so that it will seat in the cross wires 12 that are formed so as to psss beneath alternate warp wires 10. This is best seen in FIG. 2 of the drawings. This construction will therefore maintain each of the warp wires 10 in a vertical position so that its flat surface 12 will remain flat and in the same plane with the flat surfaces 16 of the other warp wires 10.

Figure 3:
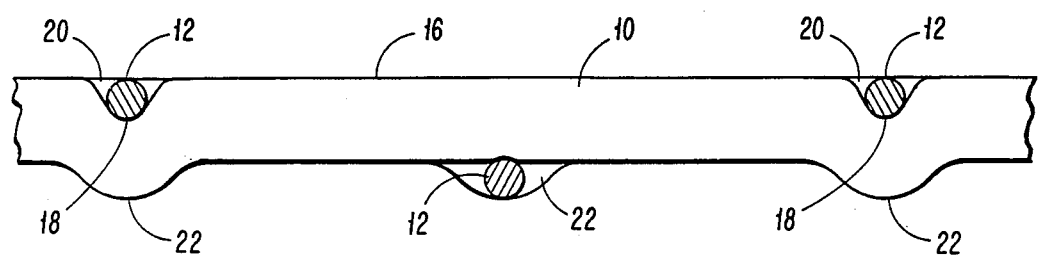
FIG. 3 is a sectional view taken on the line 3—3 of FIG. 2.

When the depressions 20 are formed in the warp wires 10, the warp wires 10 are deformed resulting in the formation of projections 22 along the bottom edges 24 of the warp wires. As best seen in FIG. 3, these projections 22 extend beneath the bottom edge 24 about the same distance as the diameter of a cross wire 12. Also, when a cross wire 12 extends beneath a warp wire 10, a slight dimple is formed in the bottom edge 24 to further maintain the rigidity of the finished floor.

With the woven wire construction of the invention, the resulting flooring will minimize any flexing when force is applied due to the weight of the pigs or hogs. This is important because the hogs tend to get nervous if the floor flexes. Also, minimizing deflection of the wire mesh floor eliminates the problem of a sow having her teats pinched when the floor deflects.

Thus, with wire mesh flooring constructed according to the principles of the invention, most of the problems of the known wire mesh flooring are eliminated while all the advantages of that type of flooring are maintained. Using warp wires with a flat top surface with the widest portion of the warp wire at or near the top, the maximum surface area is presented to the little pigs and hogs which surface is also more comfortable. The wire mesh flooring of the invention is also easier to clean thus keeping disease to a minimum because of less bacteria build up. The floor is also a stronger floor than existing construction. Although the invention has been described in connection with a preferred embodiment without departing from the principles of the invention disclosed herein. It is our intention that all such revisions and modifications as are obvious to those skilled in the art will be included within the scope of the following claims.

What is claimed is:

1. A wire mesh flooring comprising a plurality of substantially staight, parallel, spaced-apart warp wires each having the same cross-sectional area and a flat surface along its entire length, the widest portion of each warp wire being at or very near the top surface, and a plurality of parallel, spaced-apart cross wires extending alternately over and under adjacent warp wires, the top surface of each warp wire having a depression formed in it at each juncture with a cross wire to receive the cross wire so that the cross wire will not extend above the top surface of the warp wire, thereby providing a flooring that has a flat top surface with a plurality of openings therethrough which openings increase in size from the top to the bottom of the flooring.

2. The wire mesh flooring of claim 1 in which the height of each warp wire is equal to or greater than its width at the widest part.

3. The wire mesh flooring of claim 2 in which each warp wire is triangular in cross-section.

4. The wire mesh flooring of claim 3 in which each cross wire is substantially round in cross-section.

5. The wire mesh flooring of claim 1 in which each warp wire is deformed to form the depressions in its top surface thereby also forming portions protruding beneath the bottom surface, which protruding portions extend a distance greater than the thickness of a cross wire.

6. The wire mesh flooring of claim 4 in which each depression formed in the top surface of each warp wire is somewhat straight in a direction transverse to the length of the warp wire, and the cross wire at the point of juncture with the warp wire has a corresponding flat portion so that the finished floor is tightly held together.

* * * * *